US008676453B2

(12) United States Patent
Behnke et al.

(10) Patent No.: US 8,676,453 B2
(45) Date of Patent: Mar. 18, 2014

(54) METHOD FOR CONTROLLING A CROP SEPARATING PROCESS OF A COMBINE HARVESTER

(75) Inventors: Willi Behnke, Steinhagen (DE); Markus Brune, Harsewinkel (DE)

(73) Assignee: Claas Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 13/557,502

(22) Filed: Jul. 25, 2012

(65) Prior Publication Data
US 2013/0029734 A1 Jan. 31, 2013

(30) Foreign Application Priority Data

Jul. 29, 2011 (DE) .......................... 10 2011 052 282

(51) Int. Cl.
*G06F 7/70* (2006.01)
*G06F 19/00* (2011.01)
*G06G 7/00* (2006.01)
*G06G 7/76* (2006.01)

(52) U.S. Cl.
USPC ........................................... 701/50; 460/101

(58) Field of Classification Search
USPC ........ 701/50; 73/759, 12.11, 587; 460/2, 4, 5, 460/101; 56/10.2 R
See application file for complete search history.

(56) References Cited

U.S. PATENT DOCUMENTS

| 4,259,829 | A | * | 4/1981 | Strubbe ............................ 460/5 |
| 4,466,231 | A | * | 8/1984 | Rowland-Hill et al. .......... 460/2 |
| 4,875,889 | A | * | 10/1989 | Hagerer et al. .................... 460/1 |
| 5,775,072 | A | | 7/1998 | Herlitzius et al. |
| 6,468,154 | B1 | * | 10/2002 | Eggenhaus et al. ........... 460/101 |
| 6,632,136 | B2 | * | 10/2003 | Anderson et al. ............. 460/101 |
| 6,863,604 | B2 | * | 3/2005 | Behnke ............................. 460/6 |
| 6,869,355 | B2 | * | 3/2005 | Bernhardt et al. ............... 460/4 |
| 7,572,180 | B2 | * | 8/2009 | Ricketts et al. ............... 460/101 |
| 7,584,663 | B2 | * | 9/2009 | Missotten et al. .............. 73/579 |
| 7,630,808 | B2 | * | 12/2009 | Behnke et al. .................. 701/50 |
| 7,670,218 | B2 | * | 3/2010 | Behnke et al. .................... 460/4 |
| 7,713,115 | B2 | * | 5/2010 | Behnke et al. .................... 460/1 |
| 7,771,260 | B2 | * | 8/2010 | Ricketts et al. ................... 460/9 |
| 8,118,649 | B1 | * | 2/2012 | Murray et al. .................... 460/5 |
| 2005/0150202 | A1 | * | 7/2005 | Quick .......................... 56/10.2 R |
| 2009/0036184 | A1 | * | 2/2009 | Craessaerts et al. ............. 460/1 |

FOREIGN PATENT DOCUMENTS

EP 0 728 409 8/1996

* cited by examiner

*Primary Examiner* — Árpád Fábián-Kovács
(74) *Attorney, Agent, or Firm* — Michael J. Striker

(57) ABSTRACT

A method for controlling a crop separating process of a combine harvester with a separation device that transfers crop a cleaning device having at least one sieve with adjustable opening widths driven in an oscillating manner and a fan providing air flow upon the sieves to loosen the crop located thereon, assures that substantially three different loosening phases (F, S, W) occur during the loosening of the crop. The method determines current separation curves of the crop across a width of the cleaning device at points separated from each other in a conveyance direction (FR), evaluates the separation curves, detects the loosening phase (F, S, W) present in a conveyance direction (FR) by comparing the separation curves and initiates action depending on a detected loosening phase (F, S, W) that results in optimization of the loosening on at least one section of the cleaning device.

6 Claims, 4 Drawing Sheets

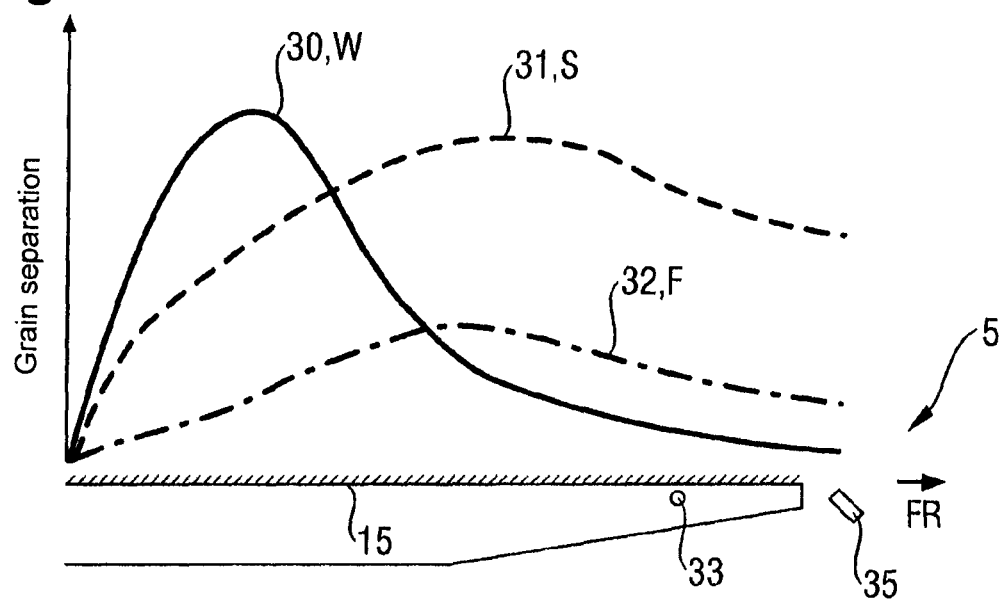
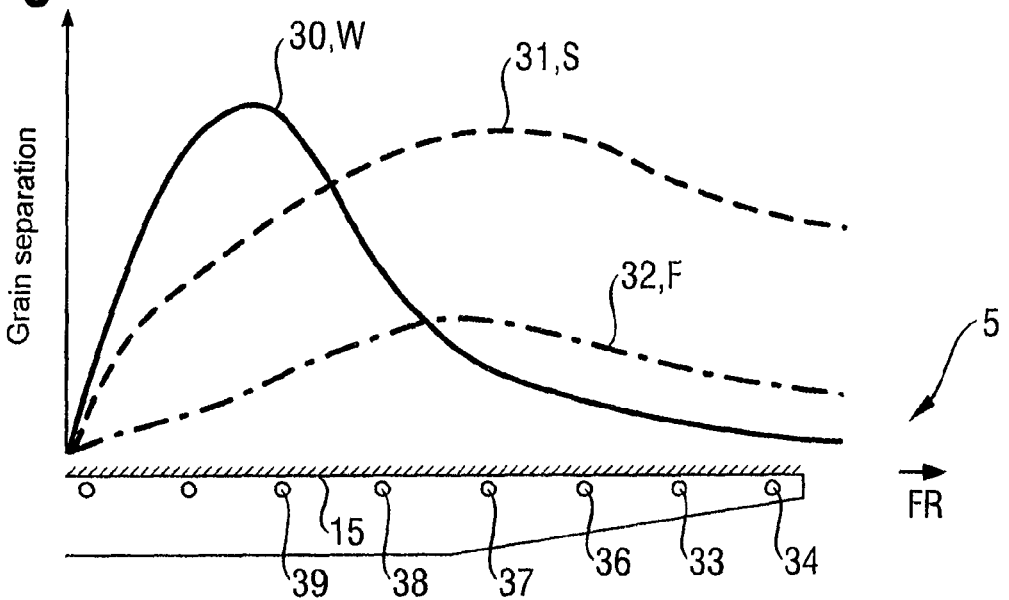

METHOD FOR CONTROLLING A CROP SEPARATING PROCESS OF A COMBINE HARVESTER

CROSS-REFERENCE TO A RELATED APPLICATION

The invention described and claimed hereinbelow is also described in German Patent Application DE 10 2011 052 282.4 filed on Jul. 29, 2011. This German Patent Application, subject matter of which is incorporated herein by reference, provides the basis for a claim of priority of invention under 35 U.S.C. 119(a)-(d).

BACKGROUND OF THE INVENTION

The invention relates to a method for controlling a crop separating process of a combine harvester having a separation device from which the crop is transferred to a cleaning device, the cleaning device comprising at least one sieve with adjustable width that is driven in an oscillating manner to separate the grain from non-grain components, and a fan that creates an air flow to act upon the at least one sieve (15, 16) to loosen the crop located thereon, wherein substantially three different loosening phases (F, S, W) occur during the loosening of the crop, and a combine harvester for implementing the method.

A method for controlling a crop separating process of a combine harvester is disclosed by EP 0 728 409. In the known method, a plurality of so-called separation sensors is assigned to (grain) separating units of the harvesting machine designed as separating sieves, on the underside thereof. The separation sensors generate measured values during operation of the harvesting machine that depend on the quantity of crop separated out. The measured values are used in an evaluation unit to determine an actual separation curve. The actual separation curve that is determined is compared with an ideal separation curve in order to change the fan speed depending on deviations that occur between the separation curves. The method seeks to match the actual separation curve to the ideal separation curve.

A disadvantage of the method has proven to be that it is based on a purely mathematical model that accounts for changing harvesting conditions to a limited extent on the basis of a change made to individual coefficients of the mathematical model by the operator of the combine harvester. With respect to setting the fan speed, the method is based on an initially established ideal separation curve that can be changed only to a slight extent, and which requires further-reaching knowledge on the part of the operator in order to implement said adaptation of the mathematical model in a meaningful manner.

SUMMARY OF THE INVENTION

The present invention overcomes the shortcomings of known arts, such as those mentioned above.

In an embodiment, the invention provides a method for controlling a crop separating process of a combine harvester having a separation device from which the crop is transferred to a cleaning device, the cleaning device comprising at least one sieve with adjustable width that is driven in an oscillating manner to separate the grain from non-grain components, and a fan that creates an air flow to act upon the at least one sieve (15, 16) to loosen the crop located thereon, wherein substantially three different loosening phases (F, S, W) occur during the loosening of the crop.

In the method, current separation curves of the crop are determined across the width of the cleaning device at points that are separated from one another in the conveyance direction. The currently determined separation curves are evaluated in order to obtain a picture of the distribution of the crop on the cleaning device. On the basis of the currently determined separation curves, the loosening phase present in the conveyance direction is detected, whereupon at least one action is initiated depending on the loosening phase that is detected. The action results in optimization of the loosening on at least one section of the cleaning device.

It is advantageous that detection of the separation curves across the width of the cleaning device makes it possible to identify the loosening phases, which differ according to location, that occur in the conveyance direction on the cleaning device as a result of the different course of separation. A distinction is made mainly between three loosening phases, which have different influences on the separation of the grain from the crop on the cleaning device. The loosening phases occurring currently in the conveyance direction can therefore be deduced on the basis of the detection of the separation distribution of grain across the width of the cleaning device in order to initiate suitable actions, which result in optimization of the loosening.

In the so-called heaping phase, crop accumulates locally in the rear region of the cleaning device because the air pressure is too low relative to the crop quantity. The heaping phase is associated with low separation in the starting region of the cleaning device, which does not increase until the crop is conveyed in the longitudinal direction of the cleaning device. The fluidized-bed phase is the optimal loosening phase that is aimed for in the cleaning process. Separation is greatest in the fluidized-bed phase because the crop has been loosened to a nearly optimal extent, and the ratio of air pressure and flow rate to crop quantity is nearly optimal. In the so-called flight phase, the flow rate relative to the crop quantity on the cleaning device is too high, and so crop is carried with the air flow over the cleaning device without adequate separation being achieved.

The different loosening phases can occur simultaneously and in a locally limited manner in the cleaning device. The most frequent cause for the occurrence of different loosening phases is the uneven distribution of crop in the cleaning device, which is often caused by a change in inclination of hilly or mountainous regions. Depending on the loosening phase that is detected, the at least one action should act upon at least one of the assemblies, either the separating device, the cleaning device or the fan. A further possibility is to influence the quantity and distribution of crop that is supplied when it is picked up by a crop front attachment.

Preferably, the fan speed is changeable in ranges depending on the loosening phase that is detected. As a result, if a lateral and/or transverse tilt occurs, the fan speed can be set individually, in the conveyance direction or transversely thereto, in accordance with the loosening phases that occur on the cleaning device. This action is implemented when a heaping phase or flight phase is detected, in order to increase the speed and, therefore, the air pressure in the case of the heaping phase or to lower the speed in the case of the flight phase in order to reduce the flow rate.

Advantageously, the fan speed is adaptable individually to the crop quantity. Control of the individual fans of the fan stage is provided for the purpose, i.e., of specifically counter-acting a lateral tilt of the combine harvester when a localized heaping or flight phase occurs as a result of the lateral tilt of the combine harvester.

A further feasible action is to influence the guidance of the air flow by actuating at least one restrictor or at least one wind board in the flow channels of the fan stage to allow the flow rate or the air pressure to be influenced depending on the loosening phase that is detected.

Alternatively, the crop quantity is adapted to the fan speed. This is accomplished by automatically adjusting the forward regulation as a function of the loosening phase that is detected in order to vary the quantity of crop that is picked up. That is, the excitation of oscillation of the at least one sieve is changed depending on the loosening phase that is detected.

Advantageously, the opening width of the at least one sieve of the cleaning device is changed depending on the loosening phase that is detected. The sieve side that has less separation due to a flight phase that occurs is closed further starting from a default setting of the sieve opening width, while the sieve side that has greater separation due to a heaping phase that occurs is opened further starting from a default setting of the sieve opening width.

As a further action, the feed width of the crop at the header is changed utilizing so-called auger panel extensions. The material flow through the combine harvester is thereby influenced at an early point in time in order to achieve a more even separation distribution. Preferably, the operator of the combine harvester is prompted visually and/or acoustically to extend the auger panel at the header to obtain a more even separation distribution during cleaning.

All of the aforementioned actions can be applied individually or in combination with one another in order to optimize the loosening on the cleaning device and, therefore, the separation in particular when the combine harvester tilts laterally and/or transversely.

Moreover, the present invention provides a combine harvester for implementing the aforementioned method for controlling a crop separating process. The inventive combine harvester comprises a separating device, from which crop is transferred to a cleaning device having at least one sieve. The at least one sieve can be driven in an oscillating manner and has adjustable opening widths. The cleaning device includes a fan, by way of which the at least one sieve can be acted upon with an air flow to loosen the crop located thereon.

According to the invention, at least two sensors are disposed in the region of the cleaning device, by way of which the current distribution of the separation of the crop is determined at least across the width of the cleaning device. In the simplest case, a sensor is used underneath the cleaning device and a further sensor is used instead of a loss sensor behind the cleaning device that detects the course of separation across the width of the cleaning device between these two. To increase the accuracy of detection of separation behavior, a plurality of sensors is advantageously distributed parallel to one another and substantially equidistantly across the length of the cleaning device below the cleaning device in order to detect a change in the separation behavior at an early point in time and to initiate at least one appropriate action.

In an embodiment, the separation sensors are installed in the longitudinal direction, that is, in the direction of conveyance of the crop on the cleaning device. As a result, the distribution of separation in the direction of conveyance and across the width of the cleaning device is detected using a small number of sensors. A further advantage of such a configuration is that the accuracy of the distribution of the separation in the conveyance direction is increased the longitudinal direction is detected without interruption.

In one form the cleaning device comprises an upper sieve and a lower sieve and the at least two sensors are disposed underneath the upper sieve.

In another form, the cleaning device comprises an upper sieve and a lower sieve and the at least two sensors are disposed at least in the output region of the upper sieve.

Preferably the separation device comprises an axial separating rotor having a plurality of separation regions, the permeability of which to crop is changeable by individually adjusting rotor flaps in the longitudinal and tranverse directions of the axial separating rotor.

Moreover, a fan stage having at least two fans is provided, the particular speed of which can be varied independently of one another.

Also, adjustable crosswind guidance devices are disposed in the region of the cleaning device. If the combine harvester experiences a lateral tilt, the reduced crop quantity on the uphill side of the cleaning device results in an increase in separation, that is, a flight phase occurs. This is due to the higher flow rate of the air flow generated by the fans. Adjusting the crosswind guidance device on the uphill side reduces the flow rate, wherein air pressure increases simultaneously, thereby improving loosening at the points having more crop, in particular toward the downhill side.

BRIEF DESCRIPTION OF THE DRAWINGS

Further features and advantages of the invention will become apparent from the description of embodiments that follows, with reference to the attached figures, wherein:

FIG. 4 a schematic depiction of a second embodiment of the cleaning device comprising two sensors for detecting the course of separation across the width of the cleaning device;

FIG. 5 a schematic depiction of the cleaning device according to a third embodiment, comprising a plurality of sensors disposed underneath the cleaning device.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
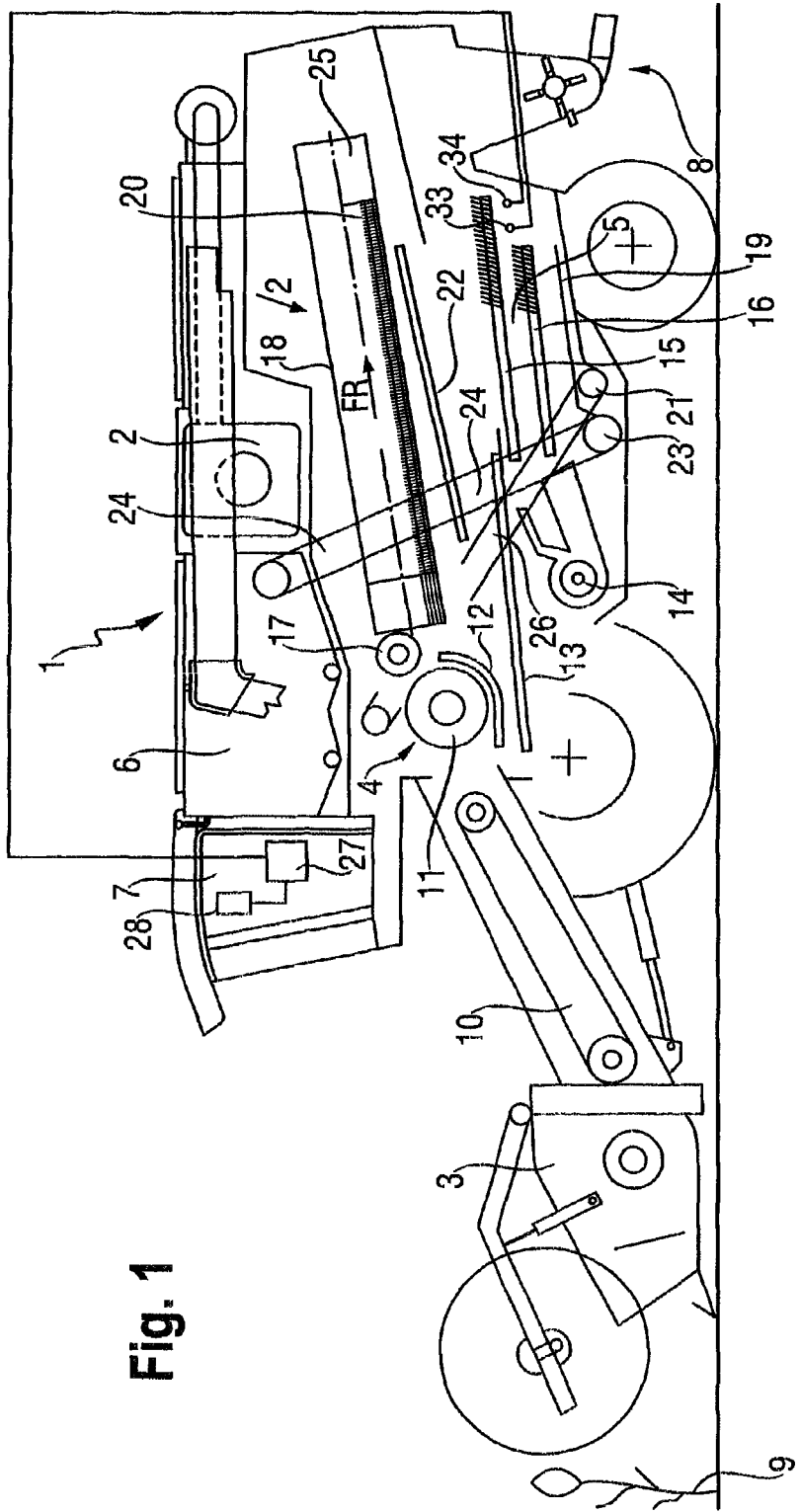
FIG. 1 a schematic longitudinal cross-sectional view of a combine harvester.

As shown in FIG. 1, the combine harvester 1 has an approximately box-shaped body, in which an internal combustion engine 2 is housed, adjacent to the top side thereof, in the central position. A grain tank 6 and a driver's cab 7 are located in front of the engine 2. In the front region thereof, the combine harvester 1 carries a height-adjustable header 3, which harvests grown crop 9 along a wide width and draws it together in the lateral direction and feeds it to a feed rake 10.

By way of the feed rake 10, the crop reaches the threshing parts 4, in a manner known per se, the threshing parts comprising a cylinder 11, an impeller 17 disposed downstream thereof, and a concave 12 in the illustration shown in FIG. 1. A crop flow, which mainly comprises grain, short straw and chaff, is separated out of the crop through openings in the concave 12 and drops to a grain pan 13. Shaking motions of the grain pan 13 cause the crop flow to be conveyed toward the rear, in the direction of a cleaning unit 5. The grain pan 13 has transverse ribs on the surface to simplify the conveyance of the crop flow in the rising direction.

The portion of the crop flow that does not pass through the concave 12 is conveyed further via the impeller 17 to an axial rotor 18, which extends in the longitudinal direction of the combine harvester 1 across a large portion of the length thereof. The axial rotor 18 is enclosed in the lower region thereof by a semi-cylindrical sieve 20, by way of which a second crop flow, which comprises mainly grain and ear fragments, is separated out and reaches a return pan 22. Instead of a single axial rotor 18, two parallel axial rotors could also be provided side-by-side. Tray-type shakers can also be used as an alternative separation device. Crop, mainly straw, that is ejected at the rear end 25 of the axial rotor 18 reaches a spreader 8 at the rear of the combine harvester 1.

On a return pan 22, which is moved in a shaking manner, the second crop flow is conveyed forward and transferred to the cleaning unit 5. In the cleaning unit, the second crop flow is combined with the first crop flow that passed through the concave 12, which is transferred from the grain pan 13 to the cleaning unit 5.

The cleaning unit 5 comprises an upper sieve 15, a lower sieve 16 and a fan 14, which acts upon the sieves 15, 16 with an air flow. A sensor pair 33, 34, in the form of bar sensors, is disposed underneath the upper sieve 15 in the end region thereof, the sensor pair extending transversely to the conveyance direction FR. The sensors 33, 34 are connected to a control device 27. The grain contained in the crop flows arriving from the grain pan 13 or the return pan 22 passes the upper sieve 15 and the lower sieve 16 in succession and reaches, by way of a pan 19 located underneath, an auger conveyance device 23 and a grain elevator 24. The grain elevator conveys the crop into a grain tank 6 disposed at the back of the driver's cab 7.

Portions of the crop flow that are lighter than the grain are captured by the air flow of the fan 14 as they drop from the grain pan 13 onto the upper sieve 15, from the upper sieve 15 onto the lower sieve 16 or from the lower sieve 16 onto the pan 19, and are carried along and reach the spreader 8, which ejects it. Heavy, coarser portions of the crop flow reach a trough, which extends transversely underneath the sieves 15, 16, by way of tailings at the rear end of the sieves 15, 16. An auger 21, which rotates in the trough, moves the material sideways to a tailings elevator 26, which conveys it back to the threshing parts 4. Moreover, the combine harvester 1 comprises a sensor device 28, which is connected to the control device 27, for determining a tilt in the longitudinal and transverse directions. The control device 27 is operatively connected to, inter alia, the cleaning device 5, the separation assemblies such as the threshing parts 4 and the axial rotor 18 or a tray-type shaker, and the fan 14, in order to control them.

Figure 2:
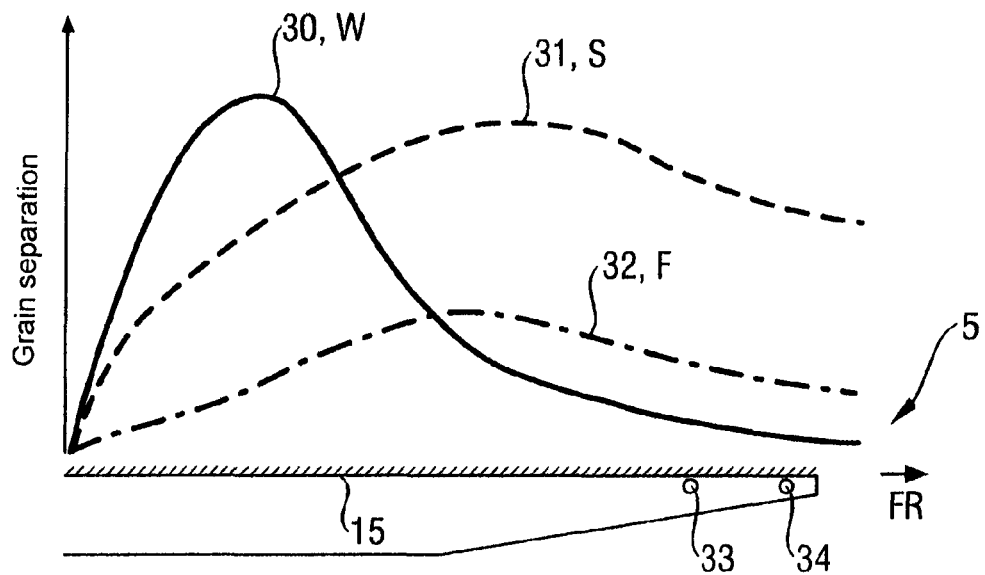
FIG. 2 a schematic depiction of an upper sieve of a cleaning device including exemplary graphs of loosening phases plotted across the length of the cleaning device.

The illustration in FIG. 2 shows a schematic depiction of the upper sieve 15 of the cleaning unit 5 in a side view. A sensor pair 33, 34 is disposed underneath the upper sieve 15 in the end region thereof, which detects the grain separation in this region. An arrow labeled with the reference sign FR indicates the conveyance direction of the crop on the cleaning unit 5. The illustration in FIG. 2 shows exemplary graphs 30, 31, 32 of the grain separation, which are plotted across the length of the upper sieve 15 and which could occur due to different loosening phases F, S, W during the cleaning process. The loosening phases F, S, W are the fluidized-bed phase W, the heaping phase S or the flight phase F, which can occur during the cleaning process distributed across the width of the cleaning unit, also in combination. A plurality of such graphs 30, 31, 32, which depend on the presence of one of the loosening phases F, S, W, is stored in a recallable manner in the control device 27 of the combine harvester 1.

The reference sign 30 labels the separation curve of the grain in the presence of a fluidized-bed phase W as the loosening phase, which is shown as a solid line. The fluidized-bed phase W is generally aimed for as an optimal loosing phase in the cleaning process since the separation of the crop is greatest in the fluidized-bed phase W. High grain separation is obtained at the very start of the cleaning unit 5, and therefore optimal separation can be achieved across the length of the cleaning unit 5. The separation curve 30 between the sensors 33 and 34 in the end region of the cleaning unit 5 has dropped markedly compared to the separation curve 30 at the start of the cleaning unit 5 since the portion of grain remaining in the crop to be cleaned is very low.

One possible shape of the separation curve of the grain in the presence of a heaping phase S as the loosening phase is shown as a dashed line 31. The heaping phase S occurs when there is disequilibrium between the air pressure of the air flow generated by the fan 14 and the crop quantity in the cleaning unit 5. The disequilibrium occurs when the pressure of the air flow generated by the fan 14 is too low for the crop quantity in the cleaning unit 5 to be loosened. The accumulation of crop on the cleaning unit 5 prevents optimal separation of the crop, thereby reducing the threshing output. The separation curve 31 of the grain in the heaping phase S differs from that in the fluidized-bed phase W in that the separation curve 31 reaches a maximum that occurs markedly behind the maximum of the separation curve 30 of the fluidized-bed phase W, as viewed in the conveyance direction FR. The height of the separation curve 31 is markedly higher in the heaping phase S at the end of the cleaning unit 5 than in the fluidized-bed phase W. The separation curve 31 in the heaping phase S is decreasing at the end of the cleaning unit 5, but remains at a high level compared to the separation curve 30 in the fluidized-bed phase W. In the end region of the cleaning unit 5, grain separation occurs during the heaping phase S independently of the rest of the separation curve 31 that is greater than in the fluidized-bed phase W according to the separation curve 30.

One possible separation curve of the grain that occurs in the presence of a flight phase F as the separation phase is indicated by a dash-dotted line 32. The flight phase F likewise occurs when there is disequilibrium between the air pressure of the air flow generated by the fan 14 and the crop quantity on the cleaning unit 5. The disequilibrium occurs when the fan pressure generated by the fan 14 is too high for the crop quantity on the cleaning unit 5 to be loosened. Due to the higher air pressure, the crop is carried in the conveyance direction FR over the cleaning unit 5, and therefore the crop separation in the cleaning unit 5 is shifted further toward the rear. The maximum of the separation in the flight phase F is located in the rear region of the cleaning unit 5 compared to the fluidized-bed phase W. Due to the smaller crop quantity, the separation curve 32 is below that of the heaping phase S, and is usually above the curve for the fluidized-bed phase W at the end of the cleaning device 5.

Placement of the sensor pair 33, 34 only in the end region of the upper sieve 15, as shown in FIG. 2, has the advantage that the grain quantity of the crop flow output by the upper sieve 15 to be detected here is not as high as in the starting region of the upper sieve 15, where the separation of the grain is generally the greatest, and therefore, the detection limit of the sensors 33, 34 is not reached in normal operation. The separation limit, that is, the spatial end of the cleaning unit 5 as viewed in the conveyance direction FR, is visible at this point, and therefore the loss can be estimated exactly. For that matter, this enables the loss to be estimated more rapidly and unambiguously than is possible using only loss sensors that are mounted behind the cleaning unit 5.

Figure 3:
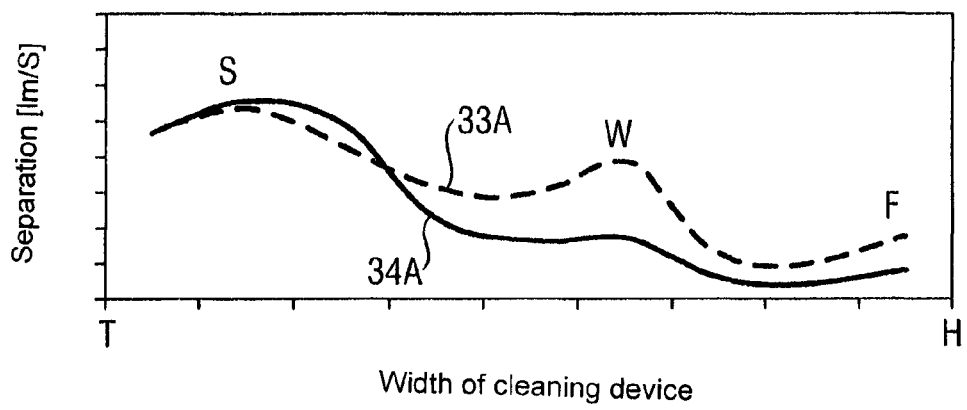
FIG. 3 a graph of separation curves plotted across the width of the cleaning device.

FIG. 3 shows an exemplary depiction of graphs 33A, 34A, which are based on signals detected by the particular sensors 33, 34 underneath the upper sieve 15 across the width thereof. The graphs 33A, 34A depict the course of the grain separation detected by the particular sensor 33, 34, across the width of the cleaning device 5 in the end region of the upper sieve 15. The sensors are arranged one behind the other as viewed in the conveyance direction FR. The graphs 33A, 34A show a situation in which the combine harvester 1 has a lateral tilt. According to the lateral tilt, the downhill side T is located on the left side of the depiction of the graphs 33A, 34A, and the uphill side H is on the right side. In the downhill region T of the cleaning unit 5, a heaping phase S occurs since the crop accumulates to a greater extent here due to gravity. A fluidized-bed phase W occurs in the center region, at least in sections, which is aimed for as the optimum for the entire separation process. The flight phase F is strongly pronounced in the uphill region of the cleaning unit 5 since very little crop is present here relative to the flow rate of the air flow provided by the fan 14.

The distribution of the transverse separation and the type of loosening phase F, S, W on the upper sieve 15 is detected on the basis of the graphs 33A, 34A. The type of loosening phase F, S, W that is present is detected by comparing the particular graphs 33A, 34A with one another (each of which represents the separation across the width of the cleaning device at the positions of the sensors 33, 34), and in comparison with the separation curves 30, 31, 32. Separation curves 30, 31, 32 are characteristic of the various separation phases F, S, W and are stored in the control device 27, and can occur in the end region of the cleaning unit 5. In the heaping phase S, the graph 33A, 34A between the two sensors 33, 34 is approximately equal and remains at a high separation level.

As the distance from the uphill edge of the upper sieve 15 increases, the separation in the heaping phase S increases since the loosening of the crop starts to change. In the subsequent fluidized-bed phase W, however, the graphs 33A, 34A are decreasing between the two sensors 33, 34 since, as viewed in the conveyance direction FR, less separable crop is available when the second sensor 34 is reached than when the first sensor 33 is reached. In the flight phase F, on the basis of the knowledge of a lateral tilt of the combine harvester 1 detected by the sensor device 28, it is assumed that the crop portion on the cleaning device 5 is less on the uphill side H than on the downhill side T. However, an increase in the graphs 33A, 34A is detected, which is due to the disequilibrium between the air pressure of the airflow generated by the fan 14 and the crop quantity on the cleaning unit 5, which results in an increase in the separation.

The illustration in FIG. 4 shows a schematic depiction of a second embodiment of the cleaning device 5 comprising two sensors for detecting the course of separation across the width of the cleaning unit 5. A first sensor 33, which detects the transverse separation, is used to detect the distribution of the transverse separation underneath the upper sieve 15 and a loss sensor 35 mounted behind the upper sieve 15 is used as a second sensor that detects the transverse separation. The use of the loss sensors 35 instead of an additional second sensor 34, which detects the transverse separation, as explained with reference to the previously described embodiment, is a lower-cost alternative. The use of the loss sensors 35 instead of an additional second sensor 34, does not function as precisely, however, as the variant having at least two sensors 33, 34 for detecting the transverse separation mounted underneath the upper sieve 15 since the detectable separation behind the upper sieve 15, that is, at the separation limit, deviates from the separation that can be detected on the upper sieve 15.

FIG. 5 shows a schematic depiction of the cleaning unit 5 according to a third embodiment comprising a plurality of sensors 33, 34, 36, 37, . . . mounted underneath the cleaning unit 5 and detecting the transverse separation. This allows the distribution of the transverse separation to be determined at an early stage and very precisely since the placement of a plurality of sensors 33, 34, 36, 37, . . . makes it possible to detect the separation curve across the entire longitudinal extension of the cleaning unit 5.

Figure 6:
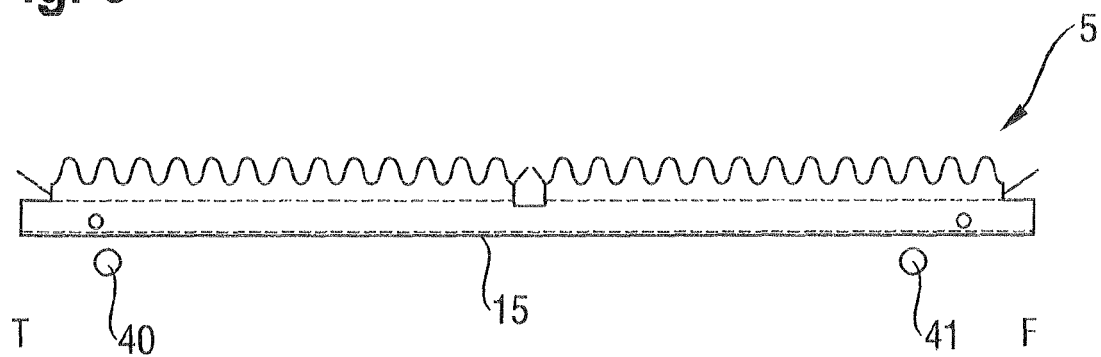
FIG. 6 a schematic depiction of a fourth embodiment of the cleaning device, comprising two sensors for detecting the course of separation, which are disposed underneath the cleaning device.

The illustration in FIG. 6 shows a schematic view of a fourth embodiment of the cleaning unit 5 comprising two sensors 40, 41, which are mounted underneath the cleaning unit 5 in the conveyance direction FR of the crop, for detecting the separation curves 30, 31, 32 in conveyance direction FR. The two sensors 40, 41 are disposed parallel to one another and, according to this embodiment, extend in the longitudinal direction of the cleaning device 5. The placement of the sensors at the outer edge underneath the upper sieve 15 (see FIG. 6) makes it possible to detect the separation distribution of the crop in the conveyance direction FR.

According to the method, to control the crop separation process of the combine harvester 1, the current graph 33A, 34A of the separation of the crop is determined across the width of the cleaning unit 5. The sensors 33, 34 detect the distribution of the grain that is output from the upper sieve 15 of the cleaning device 5 in the rear region thereof. To detect the distribution of the transverse separation, the separation distribution 33A, 34A is determined by measurement of the sound transit time difference carried out by the sensors 33, 34, which are in the form of bar-shaped sensors and extend transversely to the conveyance direction of the crop at least across the width of the upper sieve 15. The signals generated by the sensors 33, 34 are processed by the control device 27 to determine the current graph 33A, 34A of the transverse separation.

The loosening phases F, S, W that are present and are distributed across the width of the cleaning device 5 are detected by way of the evaluation of the currently determined graph 33A, 34A. Parameters such as the lateral and/or transverse tilt of the combine harvester 1 or the currently set fan speed at the fan 14 also are incorporated in the evaluation. On the basis of the evaluation, at least one action is initiated depending on the loosening phase F, S, W that is detected. This action results in optimization of the separation curve of the crop that is detected across the width of at least one section of the cleaning unit 5. The aim is to attain the fluidized-bed phase W as the loosening phase in each case since the cleaning process takes place most efficiently when this loosening phase occurs. Possible actions include varying the sieve opening width of the sieve halves of upper sieve 15 and lower sieve 16, adapting the individual fan speeds of a fan 14 having a plurality of fan stages, changing the supply of crop by utilizing auger panel extensions on the header, changing the wind guidance in the cleaning unit 5 by using adjustable wind boards, without limitation. Each of the actions is initiated depending on the loosening phase F, S, W that was identified.

Varying the sieve opening width favors the separation behavior of the cleaning unit 5 in that the sieve opening width of the sieve side having poorer separation is increased, while the sieve side having greater separation is reduced. By varying the fan speed of individual fan stages in a targeted manner, the effects of the flight phase as the loosening phase that is present is reduced to the crop to be cleaned by reducing the grain losses due to blow-out by reducing the fan speed. By way of this action, the separation process takes place at an earlier point on the cleaning unit because the flight phase is reduced. In contrast, increasing the fan speed in the presence of a heaping phase improves the loosening of the crop, thereby increasing the separation. The use of auger panel extensions helps to even out the guidance of material into the combine harvester, which translates into a more even separation distribution on the cleaning unit 5. By controlling wind boards in the cleaning unit 5, the flight phase F is reduced on the uphill side H of the combine harvester. The actions can be carried out individually or in combination in order to achieve optimal separation distribution.

The following list of reference signs of various elements mentioned above is included (as follows), for ease of explanation:

LIST OF REFERENCE CHARACTERS 1 combine harvester
2 engine
3 header
4 threshing parts
5 cleaning unit
6 grain tank
7 driver's cab
8 spreader
9 crop
10 feed rake
11 cylinder
12 concave
13 grain pan
14 fan
15 upper sieve
16 lower sieve
17 impeller
18 axial rotor
19 pan
20 sieve
21 auger
22 return pan
23 auger conveyor device
24 elevator
25 rear end
26 elevator
27 control device
28 sensor device for determining tilt
30 separation curve for fluidized-bed phase
31a separation curve for heaping phase
31b separation curve for heaping phase
32a separation curve for flight phase
32b separation curve for flight phase
33 first sensor
33A graph of transverse separation
34 second sensor
34B graph of transverse separation
35 loss sensor
36 sensor
37 sensor
40 sensor
41 sensor
F flight phase
S heaping phase
W fluidized-bed phase
H uphill side
T downhill side
FR conveyance direction As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A method for controlling a crop separating process of a combine harvester (1) comprising a controller (27), a separation device (4, 18), from which the crop is transferred to a cleaning device (5), the cleaning device comprising at least one sensor and at least one sieve (15, 16) with adjustable opening widths that is driven in an oscillating manner to separate grain in the crop from non-grain components, and a fan (14) that provides an air flow acting upon the at least one sieve (15, 16) to loosen the crop located thereon, wherein substantially three different loosening phases (F, S, W) occur during the loosening of the crop, the method comprising the steps of:
    determining current separation curves (33A, 34A) of the crop across a width of the cleaning device (5) at points separated from each other in the conveyance direction (FR),
    evaluating the current separation curves (33A, 34A),
    detecting one loosening phase of the three different loosening phases (F, S, W) that is present in a conveyance direction (FR) by comparing the current separation curves (33A, 34A), and
    based on the one detected loosening phase (F, S, W) controlling any of the separating device, the cleaning device or the fan to optimize the loosening of the crop on at least one section of the cleaning device (5).

2. The method according to claim 1, wherein the fan is controlled to change the fan speed in ranges depending on the one loosening phase (F, S, W) that is detected.

3. The method according to claim 2, wherein the fan is controlled to change the fan speed based on a detected crop quantity.

4. The method according to claim 2, wherein the crop quantity in the cleaning device is controlled according to the fan speed.

5. The method according to claim 1, wherein an excitation of oscillation of the at least one sieve (15, 16) is controlled according to the one loosening phase (F, S, W).

6. The method according to claim 1, wherein the opening width of the at least one sieve (15, 16) is controlled according to the one loosening phase (F, S, W).

* * * * *